United States Patent [19]
Compton

[11] Patent Number: 4,757,674
[45] Date of Patent: Jul. 19, 1988

[54] LIQUID COOLED SHAKER PAD

[76] Inventor: Ira Compton, 2434 Dayton Rd., Chico, Calif. 95928

[21] Appl. No.: 115,334

[22] Filed: Nov. 2, 1987

[51] Int. Cl.$^4$ .......................................... A01D 46/26
[52] U.S. Cl. .................................................. 56/340.1
[58] Field of Search .............................. 56/340.1, 12.2

[56] References Cited

U.S. PATENT DOCUMENTS

| | | | |
|---|---|---|---|
| 2,909,881 | 10/1959 | Callahan | 56/12.2 |
| 3,318,629 | 5/1967 | Brandt, Jr. | 56/340.1 |
| 3,335,556 | 8/1967 | Edgemond, Jr. | 56/340.1 |
| 3,780,510 | 12/1973 | Tompkins | 56/340.1 |
| 4,021,929 | 5/1977 | Black | 56/12.2 |

FOREIGN PATENT DOCUMENTS 158842 2/1983 German Democratic Rep. .................................. 56/12.2
2176086 12/1986 United Kingdom .............. 56/340.1

*Primary Examiner*—Paul J. Hirsch

[57] ABSTRACT

A cylindrical fruit tree shaker pad is provided with small parallel longitudinal channels manufactured into the exterior walls of the pad. The pad also has a larger centrally located longitudinal bore which communicates with grooved channels manufactured into each end of the shaker pad body structure or in grooved channels designed into two end caps, all of which communicate with the longitudinal parallel channels. These channels and grooves are designed to circulate liquid throughout the shaker pad for cooling purposes. The liquid movement can be accomplished through gravitational, convectional, or mechanical pump means. The liquid can be cooled by a radiator, by coils in an ice chest, or by refrigeration.

5 Claims, 5 Drawing Sheets

LIQUID COOLED SHAKER PAD

BACKGROUND OF THE INVENTION

1. Field of the invention

This invention is associated with shaker pads used on nut and fruit harvest equipment. The present invention is particularly directed towards a method of cooling the shaker pad itself as these become extremely hot due to the friction which is caused by the clamping and vibrating of the trees. The object of this invention is to provide a circulating liquid cooling method directly to the pad and therefor reduce the time necessary to allow the pads to air cool.

2. Description of the Prior Art

Although the basic design of fruit tree shaker pads is necessarily somewhat similar, I have seen no harvesting equipment available on the open market or even advertised in any type of publication that provides any sort of liquid cooling means for fruit tree shaker pads. With the type of equipment presently in use, harvesting must be intermittently stopped and the pads allowed to cool.

SUMMARY OF THE INVENTION

In practicing my invention, I have developed a design and method of effectively cooling shaker pads utilizing a liquid medium. My invention includes a modified shaker pad with the necessary cooling equipment and connecting apparatus to provide a continuous circulation and cooling of the fluid.

Therefore, it is a primary objective of my invention to provide a modified shaker pad with manufactured channels sufficient for circulating a liquid cooling medium.

Another object of my invention is to provide a liquid cooling method with mechanics whereby gravitational, convectional, or mechanical pump systems are utilized as a means of circulating heated liquid from the shaker pads to a cooling unit or radiator located on the harvest vehicle.

A still further object of the invention is to provide a method and apparatus of harvesting fruit and nut trees which reduces or eliminates the time period required to allow the shaker pads to air cool.

Further objects and advantages of my invention will be better understood with a reading of the numbered parts in the specification and subsequent comparison of them with similar numbered parts shown in the accompanyingg drawings.

Figure 1:
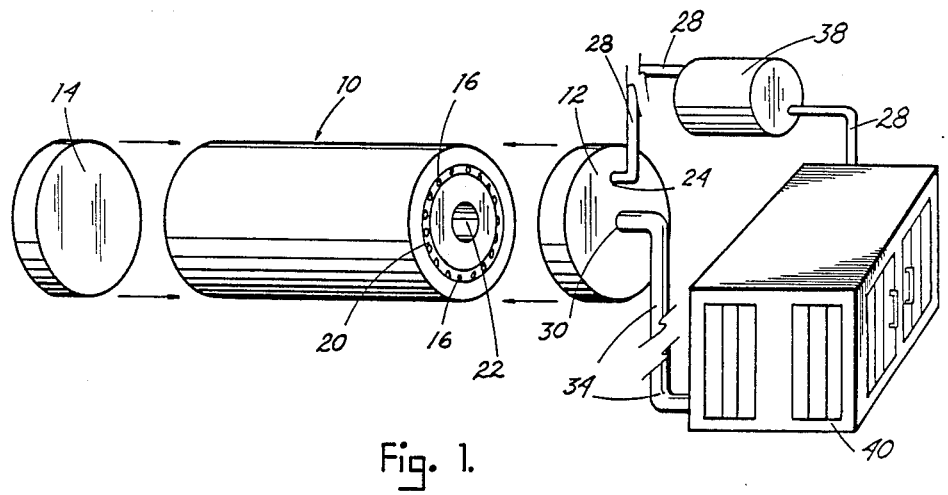
FIG. 1 shows a perspective side view of the unassembled shaker pad along with the connections to a radiator and pump system.

DRAWING REFERENCE NUMBERS 10 shaker pad one (preferred embodiment)
12 top end cap one
14 bottom end cap one
16 longitudinal channels
18 radial cross channels
20 circular groove
22 central bore
24 fluid inlet
26 fluid inlet snap connector
28 inflow tubing
30 fluid outlet
32 fluid outlet snap connector
34 outflow tubing
36 fluid directional arrows
38 auxiliary pump
40 refrigeration unit
42 radiator
46 sling
48 shaker arm
50 connector plate
52 connector bolts
54 harvest vehicle
56 tree
58 shaker pad two (alternate embodiment)
60 top end cap two
62 circular channel
64 outflow channel restricter edges
66 bottom end cap two
68 overlapping cap edges
69 slip pad
70 dish channel
71 bungie cord 72 bungie cord hook
73 heat resistant grease

DESCRIPTION OF THE PREFERRED EMBODIMENT

Figure 2:
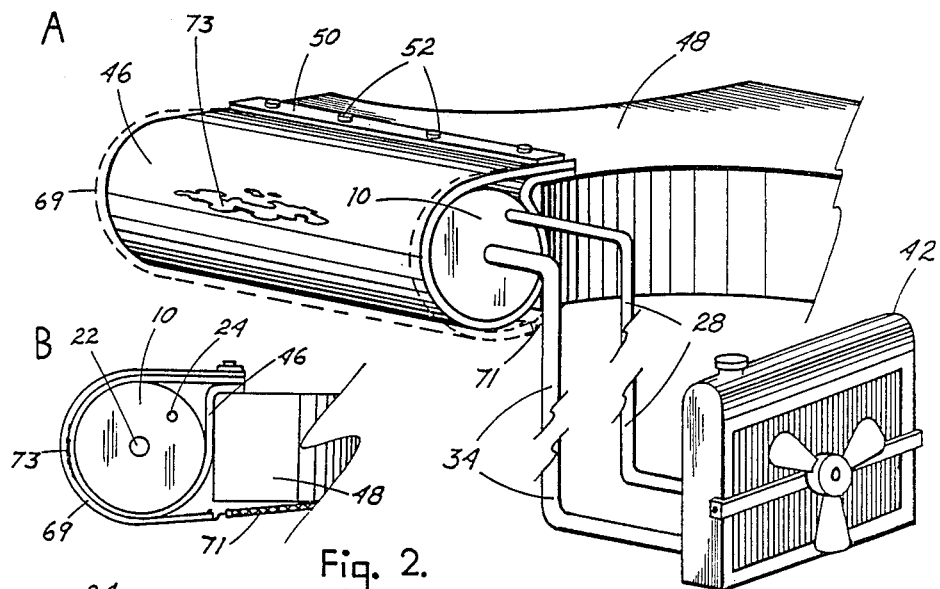
FIG. 2 at A shows a perspective side view of the assembled shaker pad sling-mounted with the greased section shown and the slip pad outlined with the shaker pad in place in its use position attached to the harvest equipment showing and illustrating connections to a radiator; and at B the shaker pad, the sling mount, the greased surface, and the attached slip pad are illustrated in an end view.
Figure 3:
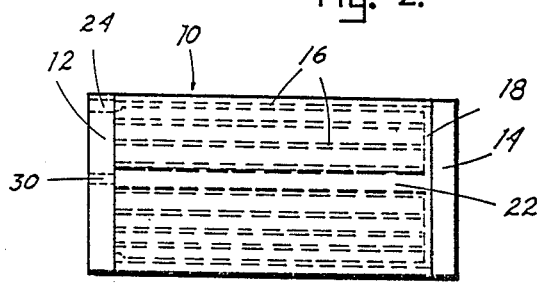
FIG. 3 shows a side transparent view of the shaker pad with two end caps enclosing each end and depicting the dotted lines as the placement of the manufactured fluid channels and central bore.
Figure 4:
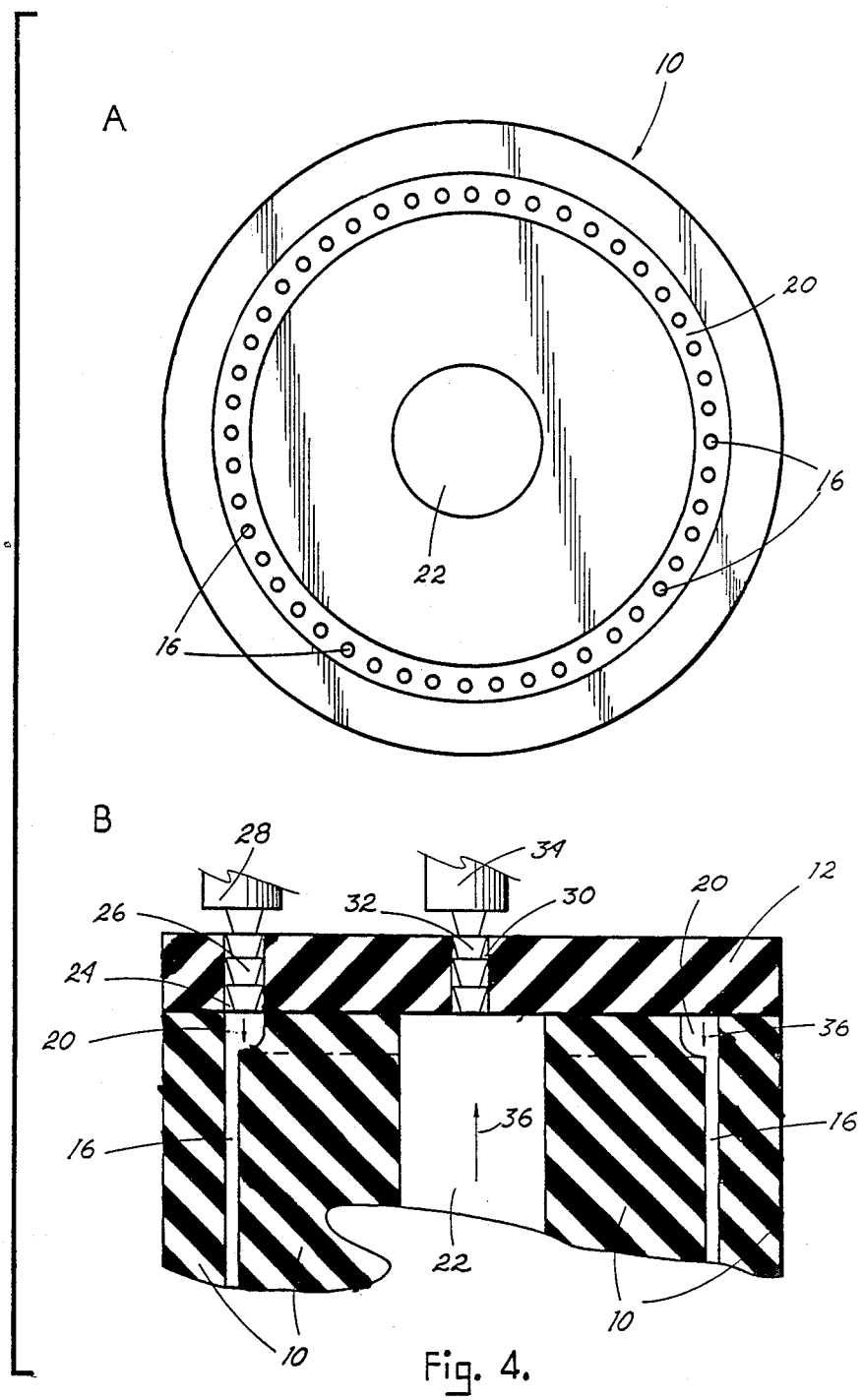
FIG. 4 A, shows a top view of the shaker pad with the central bore surrounded by a centrally located circular groove showing the top portions of the longitudinal channels positioned within the center of the central groove. B illustrates a transectional side view of the top section of the shaker pad with the top end cap attached showing the central bore and longitudinal channels with connections to inflow and outflow tubing.
Figure 5:
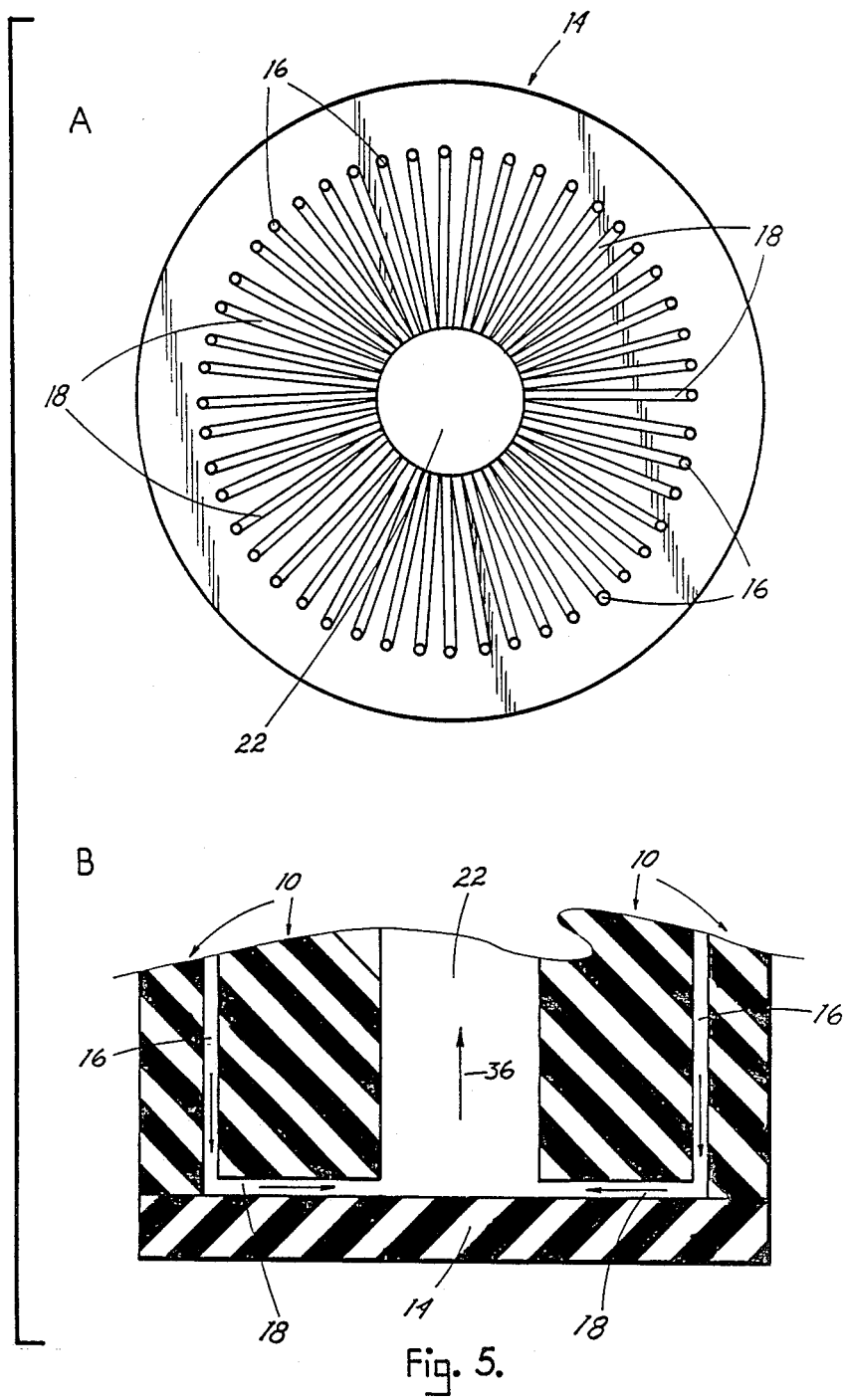
FIG. 5 A, shows a bottom view of the shaker pad illustrating the radial cross channels converging together and opening into the central bore. B, shows a transectional side view of the bottom portion of the shaker with the end cap attached and depicting the longitudinal and radial cross channels opening into the central bore.
Figure 6:
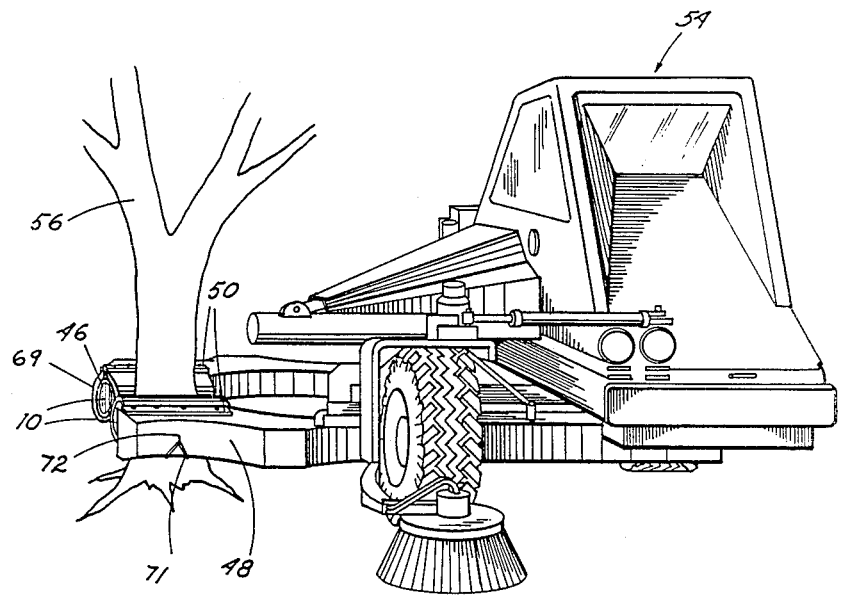
FIG. 6 shows two shaker pads in use attached by slings to the harvesting vehicle and under greased slip pads with one shaker pad positioned on each side of the tree.
Figure 7:
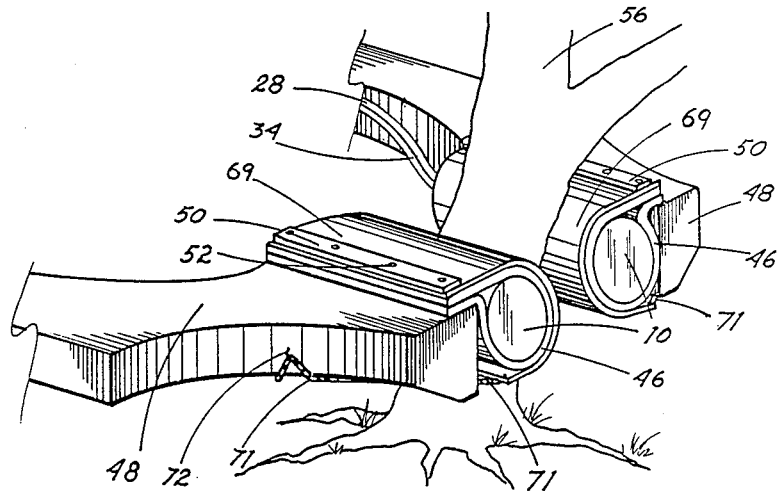
FIG. 7 shows a perspective view of two shaker pads showing the sling method of attachment to the arms of the harvest vehicle and showing the position of the shaker pads under the slip pad clamped to a tree.

Referring now to the drawings where two embodiment of the invention are illustrated. The designation "pad one" and "top end cap one" refers to the preferred embodiment while "pad two" and "top end cap two" refers to the alternate embodiment. In FIG. 1, shaker pad one 10 is positioned horizontally between top end cap one 12 on the right and bottom end cap one 14 on the left. Longitudinal channels 16 run the length of shaker pad one 10 as shown in FIG. 3. The top ends of longitudinal grooves 16 connect with circular groove 20, which surrounds central bore 22, as shown in FIG. 4 A, and are all positioned on the top surface of shaker pad one 10. Bottom end cap one 14 is a flat disc positioned to the left of shaker pad one 10 and when assembled, encloses radial cross channels 18, as shown in FIG. 5 A. Radial cross channels 18 connect to central bore 22 on the bottom surface of shaker pad one 10, as shown in FIG. 5 B. Fluid inlet 24 is located within top end cap one 12 and is positioned over circular groove 20, as shown in FIG. 4 B. Fluid inlet snap connector 26, which is inserted into fluid inlet 24, is connected to inflow tubing 28, also shown in FIG. 4 B. Fluid outlet 30 is located in top cap one 12 and is positioned over central bore 22, as shown in FIG. 4 B. Fluid outlet snap connector 32, which is inserted into fluid outlet 30, is connected to outflow tubing 34, also shown in FIG. 4 B. Outflow tubing 34 is connected to refrigeration unit 40, shown in FIG. 1, or to radiator 42 with attached accessory fan 44, shown in FIG. 2. Inflow tubing 28 is connected directly to radiator 42 or to refrigeration unit 40 or can be passed through auxiliary pump 38. Shaker pad one 10 is mounted by shaker pad attachment wrap 46 to shaker arm 48 with connector plate 50 and connector bolts 52, as seen in FIG. 2. Shaker arm 48 is attached to harvest vehicle 54 which in use is positioned along side of tree 56, as seen in FIGS. 6 and 7, when harvesting is in progress. A slip pad 69 is attached also to connector plate 50, is wrapped around shaker pad one 10 and attached by bungie cords 71 to shaker arm 48 by hooks 72. The outer surface of shaker pad one 10 is greased as illustrated in A and B of FIG. 2 with high heat resistance grease 73 which is between the outer surface of shaker pad one 10 and the inner surface of slip pad 69. Heat is reduced and ware to the outer surface of shaker pad one 10 is minimized. It is to be noted that an outer slip pad with a greased inner surface is commonly used in shaker operations and the present invention is directed towards liquid cooling of the shaker pad structure.

Figure 8:
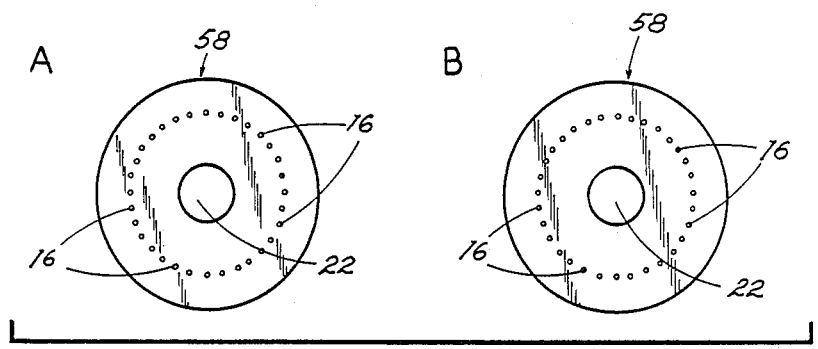
FIG. 8 A shows the top end view of the second embodiment, shaker pad two, and B depicts the bottom end view of the same embodiment.
Figure 9:
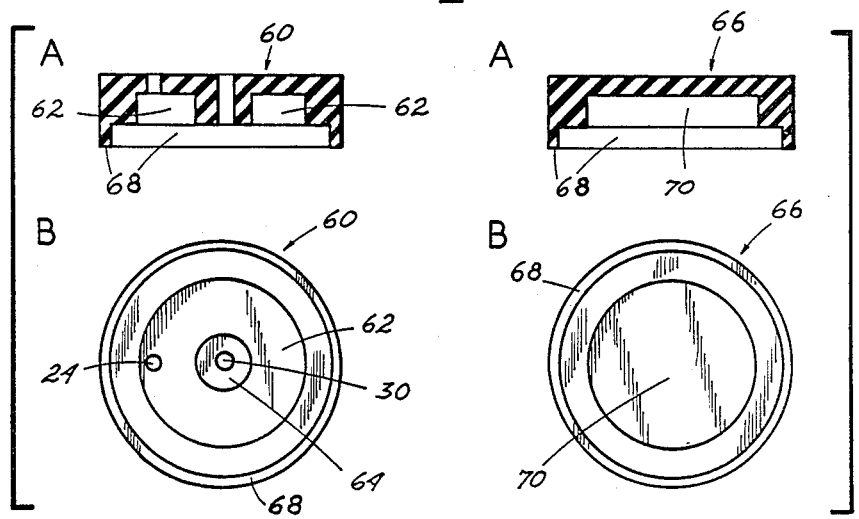
FIG. 9 A shows a cross sectional side view of the top cap of the second embodiment and B is a plan view upward into the cap of the second embodiment.
Figure 10:
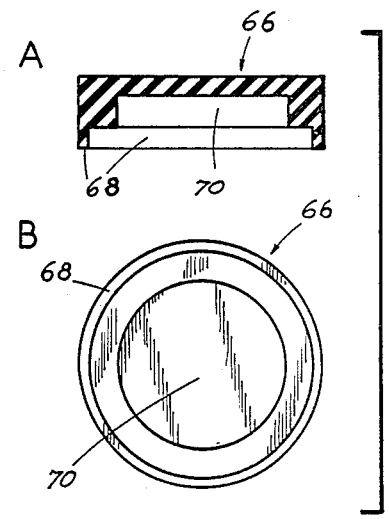
FIG. 10 A shows a cross sectional side view of the bottom cap of the second embodiment and B shows a plan view looking downward inside the bottom cap.
Figure 11:
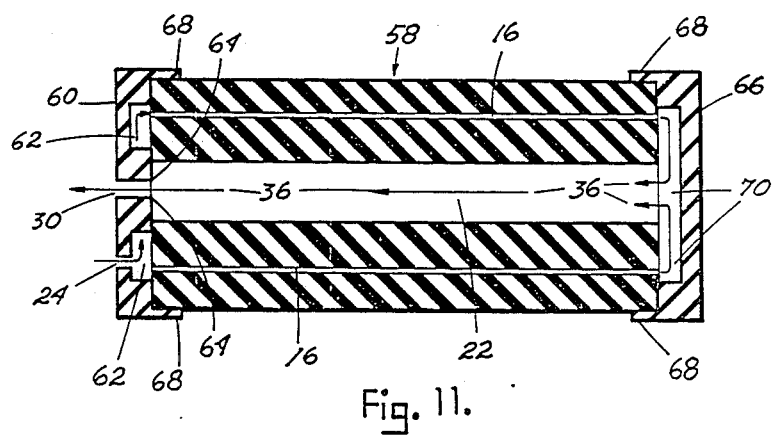
FIG. 11 shows an assembled cross sectional view of the second embodiment with arrows indicating fluid flow.

The second embodiment of the invention, shaker pad two 58, is comprised only of longitudinal channels 16 and central bore 22, as seen in FIG. 8 A, the top view, and B the bottom view. Top end cap two 60 is structured with circular channel 62 which connects with all longitudinal channels 16. Circular channel 62 also separately connects with central bore 22 by means of outflow channel restricter edges 64. Top end cap two 60 has overlapping cap edge 66 as seen in FIGS. 9, 10 and 11 for sealed attachment to shaker pad two 58. Bottom end cap two 68 is structured with dish channel 70 which connects with all outlets of longitudinal channels 16 and central bore 22 at the same time. The fluid coursing relationship of dish channel 70 and circular channel 62 with longitudinal channels 16 and central bore 22 is illustrated in FIG. 11. Top end cap two 60 and bottom end cap two 66 have overlapping cap edge 68 for sealed connection to shaker pad two 58 as seen in FIGS. 9, 10 and 11. Shaker pad one 10 and shaker pad two 58 are interchangeable in use.

Although I have described my invention in length and in detail in the specification, it is to be understood that modifications may be practiced which do not exceed the intended scope of the appended claims.

What I claim is:

1. A liquid cooled fruit tree shaker pad comprising:
   a substantially tubular-shaped primary member longer longitudinally then diametrically and structured of firm rubbery material;
   said primary member provided with a multiple of small circularly aligned tubular longitudinal channels manufactured into said firm rubbery material immediate to and uniformly paralleling the exterior longitudinal wall of said primary member;
   said primary member provided substantially centrally with a longitudinal bore sized sufficiently larger than said small tubular longitudinal channels to accommodate a volume equal to the combined volume capacity of all said small tubular longitudinal channels; said longitudinal bore and said small tubular longitudinal channels in passage communication with grooved channels manufactured in each end surface of said primary member arranged for complete internal circulation of a fluid therethrough when said grooved channels are end walled by sealed end caps affixed one to each end of said primary member;
   one of said sealed end caps apertured centrally in direct alignment with said longitudinal bore to a size suitable for receiving a fluid outlet snap connector affixed with a drain hose and the same said sealed end cap also apertured edgeward in alignment with one said grooved channel conjoining said small longitudinal tubular channels in a size suitable for receiving a fluid inlet snap connector affixed with a fluid inlet hose, said outlet and said inlet hoses attached into a fluid circulatory system as a part thereof;
   said circulatory system sufficiently of a closed nature to be charged with and retain a liquid coolant or a low viscosity fluid mixture, there being means for cooling and for causing said liquid or said fluid mixture to course first through said small circularly aligned tubular longitudinal channels and second to be returned via said grooved channels manufactured in the end of said primary member to said longitudinal bore and exited through said outlet snap-in connector into said drain hose and returned to said cooling means.

2. The device of claim 1 wherein said firm rubbery material is various compositions of natural rubber, fabric-rubber mixtures, and synthetics.

3. The device of claim 1 wherein said primary member is provided with said multiple of small circularly aligned tubular longitudinal channels and with said longitudinal bore configurational to the claim 1 described structure with said channels and said bore openly terminated in flat surfaces at both ends of said primary member and having said grooved passage communicational channels manufactured in said sealed end caps with one of said sealed end caps affixed with said fluid intake snap connector edgewise positioned and said fluid outlet snap connector centrally positioned with appropriate hoses, cooling, and circulatory means for circulating a liquid coolant through said primary member.

4. The device of claim 1 wherein said means for causing said liquid or said fluid mixture to course through said circulatory system particular to this invention includes gravitational, convectional, mechanical pump, and combinations thereof.

5. The device of claim 1 wherein said means for cooling said liquid coolant or said fluid mixture particular to said system of this invention includes an air radiation structure, a fan enhanced radiator structure, tubular ice chest submersion, and various refrigeration systems.

* * * * *